United States Patent [19]

Boros

[11] 4,323,754
[45] Apr. 6, 1982

[54] WELDING AUTOMOTIVE BRAKE SHOES BY HIGH FREQUENCY RESISTANCE WELDING

[75] Inventor: Lawrence A. Boros, Ashtabula, Ohio

[73] Assignee: Rockwell International Corporation, Pittsburgh, Pa.

[21] Appl. No.: 182,049

[22] Filed: Aug. 28, 1980

[51] Int. Cl.$^3$ ............................................ B23K 11/32
[52] U.S. Cl. .................................... 219/107; 219/159; 219/78.16
[58] Field of Search .................. 219/61.2, 78.01, 78.16, 219/102, 107, 159

[56] References Cited

U.S. PATENT DOCUMENTS

| | | | |
|---|---|---|---|
| 2,041,461 | 5/1936 | Floyd et al. | 219/159 X |
| 3,327,088 | 6/1967 | Rudd | 219/107 X |
| 3,588,426 | 6/1971 | Harriau et al. | 219/107 X |

*Primary Examiner*—J. V. Truhe
*Assistant Examiner*—Keith E. George

[57] ABSTRACT

A method is provided for welding an edge surface of a curved metal brake shoe web to a metal brake shoe table. The brake shoe table surface has a greater radius of curvature than the brake shoe web prior to welding. The method consists of the steps of positioning the brake shoe table in longitudinal alignment with the brake shoe web with one end portion of the table surface abutting the brake shoe web surface over a predetermined distance and with the table surface diverging away from the brake shoe web edge to form a vertex where the surfaces abut. The abutting surfaces of the brake shoe web and the brake table are then pressed together at the vertex. The diverging surfaces of the brake shoe web and the brake table are contacted by separate electrodes. The high frequency alternating potential is then provided to each of the electrodes contacting the table and the web to induce a current to flow therebetween and thereby heat the interfacing surfaces in the area of the vertex. The brake shoe table and the brake shoe web are then rotated together along a curvelinear path while the pressure therebetween and the high frequency heating current applied thereto is maintained thereby welding the interfacing surfaces together. The rotation is stopped before the electrodes contacting the table traverse the other side of the diverging table surface and the alternating potential is allowed to reduce thereby allowing the high frequency heating current to dissipate.

8 Claims, 8 Drawing Figures

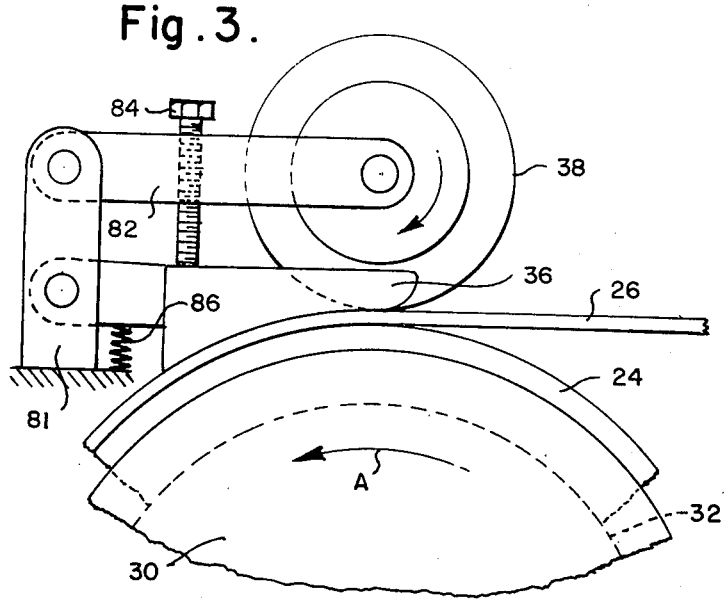
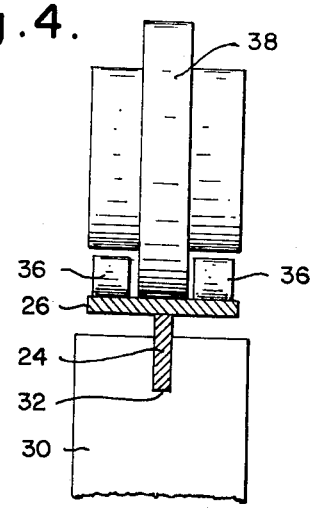
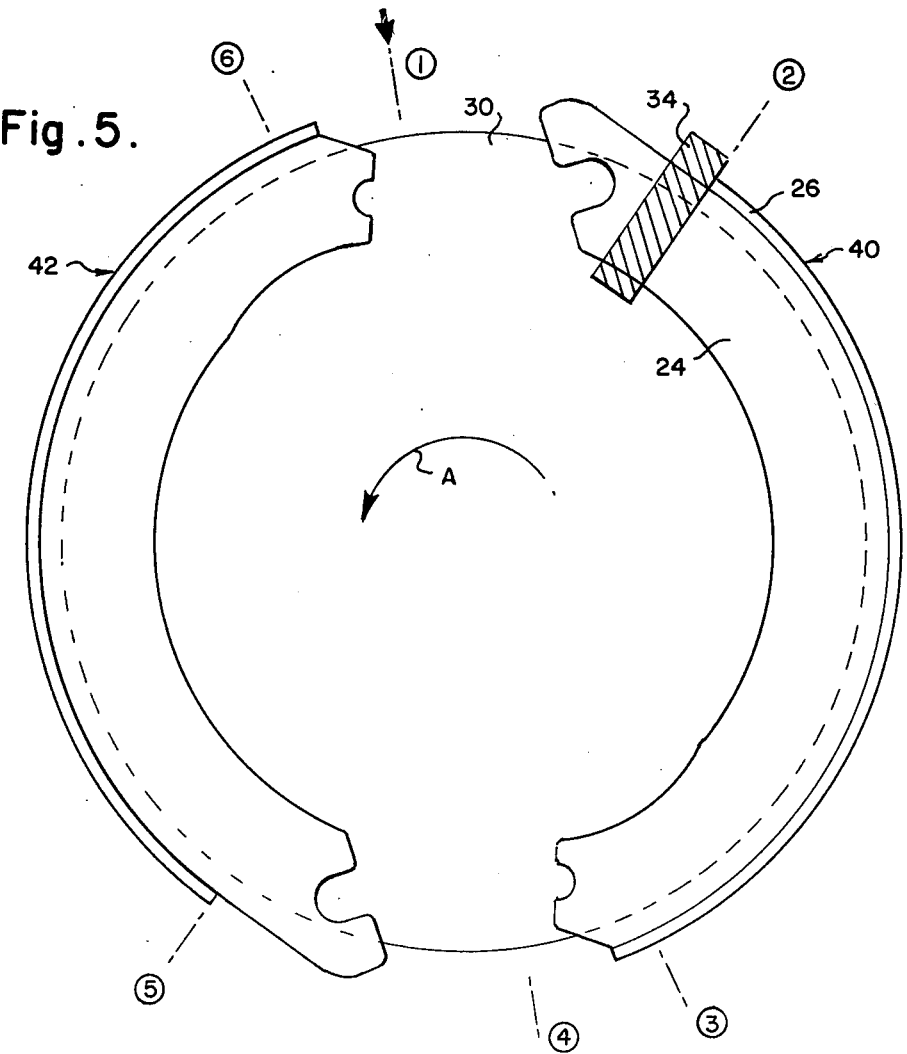

WELDING AUTOMOTIVE BRAKE SHOES BY HIGH FREQUENCY RESISTANCE WELDING

BACKGROUND OF THE INVENTION

1. Field of the Invention

This invention relates to methods and apparatus for welding by use of high frequency electrical resistance heating and, more particularly, to the welding of the brake webs to brake tables to form brake shoes.

2. Description of the Prior Art

Traditionally, brake shoes have been formed by a series of projection welds between the brake table and the brake web. This has been accomplished by providing projections on a flate plate or table to concentrate the power flowing through the web. The web and the table are rolled together and resistance welded at the projections. The projections provide the metal that forms the weld to hold the brake shoe together. In the present invention, there are no projections. In the present invention, each brake web has a die break which can be defined as a small angular projection of metal which has been left by the die in the machine which stamps out the curved web pieces from flat metal plate. During welding the die brake melts and is forced into contact with heated metal of the brake table to provide most of the metal for the weld.

If one were to attempt to utilize the old method of resistance welding to form a continuous weld as is formed in the brake shoe of the present invention, two deleterious conditions would occur. First, the tremendous amount of heat required would melt so much of the web metal that the outer radius of the web would lose its shape thereby distorting the final brake shoe. In addition, the heat required would melt so much of the metal in the brake table that the thickness of the metal in the table under the web table interface would be greatly reduced. The combination of these two effects would result in a brake shoe that had a weaker web table weld interface than a brake shoe made by a series of projection welds of the same type.

By using a high voltage radio frequency current, a continuous weld of fused metal from the table and the web can be produced without any of the deleterious effects that occur in the prior art. Since the use of high frequency (200,000 Hz or more) versus the low frequency (60 Hz) prior art resistance welding brings about current densities in the order of 1 million watts per cubic inch at the weld point between the web and the table heating can be localized. When the localized heating is coupled with a rapid controlled advance of the weld point, the amount of fusion between the web and the table and the resultant melting thereof can be very closely controlled. The weld of the present invention uses only the die break on the web, which is about 0.017 inches, as the metal utilized for fusion. Therefore, the dimensions of both the table and the web remain relatively unchanged.

It is not desirable to use arc welding in making brake shoes since this requires fillet welds on either side of the web-table interface. These fillets (usually 3/16") may impinge on the rivet holes which are placed relatively close to the web to enable the braking material to be riveted on the brake shoe. Also, in a brake shoe with two webs, as is the case in the preferred embodiments discussed below, it is difficult to position two weld electrodes within the space between the two webs. In addition, the extra cost of slow weld speeds, weld wire and shield gas must be considered.

As will be better described below, the welds produced by the present invention are of superior strength when compared to the prior art resistance welding methods.

There are many examples of prior art devices which utilize radio frequency welding to form various continuous welds of strips and the like. U.S. Pat. No. 2,821,619, issued Jan. 28, 1958 to W. C. Rudd discloses the basic method of using high frequency electrical resistance to weld a continuous strip for a metal flange.

U.S. Pat. No. 3,513,284, issed May 19, 1970 to J. N. Snyder discloses an apparatus which uses high frequency resistance heating for welding an edge of a web member to the face of a flange member to form a long structural shape. This apparatus cannot be used for the welding of short sections as is the apparatus of the present invention.

U.S. Pat. No. 3,375,344, issued Mar. 26, 1968 to F. Kohler et al discloses a method and apparatus for simultaneously welding elongated metal members together at two spaced weld points using high frequency electrical current. Again, the apparatus disclosed is used to weld structural shapes out of long strips of metal and not short pieces as in the present invention.

U.S. Pat. No. 3,391,267, issued July 2, 1968 to W. C. Rudd also shows an apparatus for welding long strips to form structural shapes such as I beams. This patent also discloses a method of welding finite length flange sections to the web as long as the flange sections are in end to end contact. If this were not the case, as the patent points out, there would be weld interruptions or irregularities in the weld seam and a foot or more of the welded beam structure would have to be cut off and wasted where the trailing and leading ends of the successive strip pieces pass through the welding zone. In the present invention, the entire weld length may be no more than 14 inches and the method described below must be used to insure that a high quality weld is formed almost to the end of the brake table brake web interface.

SUMMARY OF THE INVENTION

It is an object of this invention to provide high frequency resistance heating apparatus which will efficiently concentrate heat along the weld path of a relatively short flange member to which is welded the edge of a relatively short curved web member.

Another object of this invention is to provide improved high frequency resistance heating apparatus which will permit the welding of brake shoes more rapidly than presently known brake shoe welding apparatus.

It is an additional object of this invention to provide a high frequency resistance heating apparatus which will efficiently concentrate heat along the weld path of a relatively short brake table to which is welded simultaneously the edges of two curved web member having a relatively short length.

It is a further object of this invention to provide a high frequency resistance welding apparatus and method which will permit the welding of relatively short flange and web pieces which produce a high quality weld almost to the end of the flange web interface.

It is yet another object of this invention to provide an automotive brake shoe having at least one web which has superior weld strenght at the web table interface compared to prior art resistance welded automotive brake shoes.

It is a still another object of this invention to provide a high frequency resistance welding apparatus which will simultaneously weld a brake table and a brake web to one another while simultaneously shaping the brake table to conform to the correct curvature required for the brake shoe.

It is yet another object of this invention to provide a high frequency welding apparatus in which the forces used to force the brake table into contact with an electrical conductor are transmitted mechanically through a pivoting arrangement to cause a second conductor to contact the brake web prior to welding.

BRIEF DESCRIPTION OF THE DRAWINGS

Other objects, features and advantages of the present invention will be readily apparent from the following detailed description of certain preferred embodiments thereof which in conjunction with the accompanying drawings in which:

FIG. 3 is an elevational view of the hold down method of the present invention;

FIG. 4 is an end on view of the apparatus of FIG. 3;

FIG. 5 is a cut away view of the brake shoes mounted on the fixture of FIG. 3 showing various positions of rotation of the fixture;

DESCRIPTION OF THE PREFERRED EMBODIMENT

Figure 1:
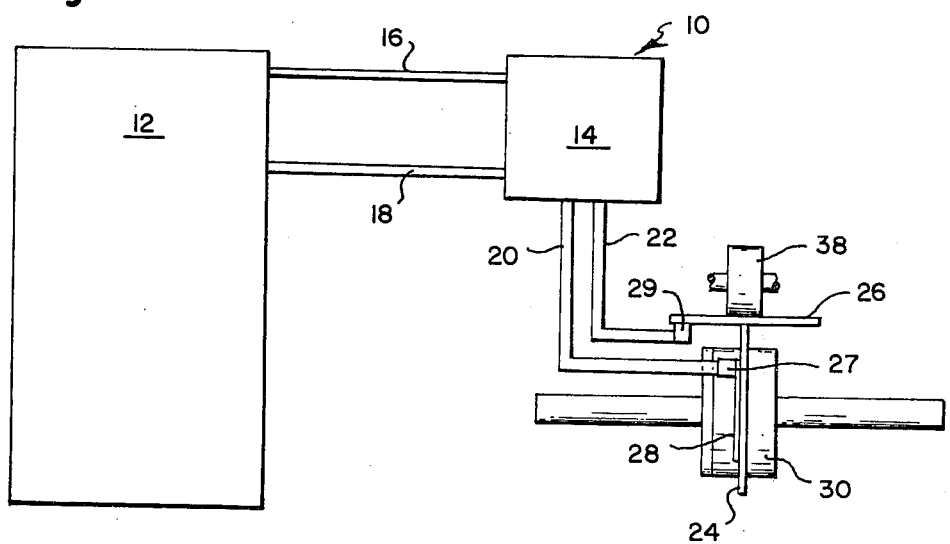
FIG. 1 illustrates a schematic of the automatic welding apparatus of the present invention.

Referring to FIG. 1, there is shown a schematic view of the radio frequency welding system of the present invention which is generally denoted as 10. As indicated above, radio frequency welding systems are well known in the prior art. These welding systems generally consist of a radio frequency oscillator power supply 12 which feeds a radio frequency transformer 14 through primary conductors 16 and 18. Secondary conductors 20 and 22 convey the power from the transformer to the workpieces. In the present invention, the secondary conductors 20 and 22 are connected to both the brake web 24 and the brake table 26 respectively via a web ring contactor 27 and a table contactor 29.

Specifically, the conductors consist of a brake table conductor 22 which conducts power directly from the transformer to the table contactor 29 then to the brake table 26 and a web ring conductor 20 which conducts power to a web ring contactor 27 and then into a web contactor ring 28 which abuts the brake shoe web 24.

In the preferred embodiment, the radio frequency oscillator 12 and the radio frequency transformer 14 are situated in close proximity to minimize the length of the primary conductors 16 and 18. It has been found that power losses are greatly reduced if the length of the conductors 16 and 18 are kept at a minimum. Similarly, the location of the fixture for holding the brake web and the brake table for welding is located in close proximity to the radio frequency transformer 14 to minimize the length of the secondary conductors 20 and 22. In the preferred embodiment both the primary and secondary conductors are made of copper. Additional details of the secondary conductor will be described more fully below.

In the preferred embodiment, the oscillator 12 is a 150,000 kilowatt oscillator that converts 480 volt, 60 cycle alternating current to 1,300 volt, 300,000 cycle alternating current. The preferred frequency for operation will always be in the high frequency range between 200,000 cycles and 500,000 cycles.

The preferred brake table contactor 29 and the web ring 28 engage the brake shoe web 24 and the brake shoe table 26 after they have been located on a fixture 30. The fixture 30 has at least one slot 32 therein to receive and index the brake web 24. The fixture 30 also has a locating element 34 which stops the brake shoe table 26 when it is being fed onto the fixture and correctly positions it with respect to the brake web 24 to insure that the brake web and brake table are welded together in a proper position. In the preferred embodiment, the brake table 26 is initially flat although this is not necessary. The brake web, on the other hand, has a curvature equal to the desired curvature of the finished brake shoe. Thus, when the brake table and brake web and fed into the fixture such that one end of brake table 26 abuts one end of brake web 24, a diverging gap will be produced with its vertex at the abutting point between the brake table and the brake web. It is necessary to maintain a diverging gap during the welding operation since the power from the radio frequency oscillator will be concentrated at the vertex between the brake shoe table and web causing the heating thereof and consequent welding.

As can be seen in FIG. 3, a finger like hold down fixture 36 is provided. The hold down fixture 36 is positioned with respect to the contact area between web 24 and table 26 such that when welding is started and fixture 30 rotates in the direction marked A on FIG. 3, the hold down fixture provides initial deflection of the brake table to insure that after welding the finished brake shoe has the correct curvature. The hold down fixture 36 need be provided for only 2 or 3 inches beyond the weld point since by that distance the weld between the brake web 24 and the brake table 26 is strong enough after cooling to keep those two parts together. If the hold down fixture 36 were not provided, the weld would tear immediately after the brake web and brake table pass beyond the forge wheel 38. If two brake webs 24 are utilized, as is the case with the preferred brake shoe shown in FIG. 7, two hold down fixtures similar to that shown in FIG. 5 would be used and the hold down fixtures would be positioned along the brake table outboard of the webs.

In addition, FIG. 3 shows the support means for the forge wheel 38 and the hold down fixture 36. The support means consists of a frame 81 which may be mounted to the base of the support structure for the entire machine. A forge wheel support arm 82 is pivotally mounted to the support 81 to allow the forge wheel 38 to move in the vertical direction. The forge wheel 38 can be moved vertically up and down by a hydraulic system (not shown). The hold down fixture 36 is also pivotally mounted on the support structure 81. In the preferred embodiment, a bolt 84 is threaded through the arm 82 to contact the hold down fixture 36. The bolt 84 transmits the hydraulic force applied to forge wheel 38 to the hold down fixture 36 to insure clamping between the brake table 26 and the brake web 24. The bolt 84 may be adjusted in the vertical direction to insure proper engagement of the hold down fixture 36. A spring 86 is provided to lift the hold down fixture 36 out of engagement with the brake shoe when the forge wheel 38 moves in the vertical direction out of engagement with the brake shoe table 26.

FIG. 5 shows two brake shoes mounted on fixture 30. In the preferred embodiment, the method of welding the brake web 24 to the brake shoe table 26 involves automatically feeding the web and table onto the fixture 30, welding the two pieces together as fixture 30 rotates in the A direction and removing the finished brake shoe after welding is completed. As the weld ends on brake shoe 40 the fixture rotates slightly, as will be described below, to accommodate the loading of the brake web and brake table for brake shoe 42.

As can be seen in FIG. 5, the web 24 for brake shoe 40 is loaded onto the stationary fixture 30 when point one is at the arrow. The fixture 30 clamps the web 24 and then rotates so that point two is at the arrow and then the table 26 is fed in to stop 34. Rotation at this time is delayed until after the forge wheel 38 is lowered against the table 26. This action also forces it into contact with the contactor 29 at the end of the secondary conductor 20.

The power build up takes between 0.05 and 2 seconds until reaching the operating levels set forth above. On reaching the operating level, fixture 30 again begins to rotate so that a continuous forge weld is formed between the brake web 24 and the brake table 26. This welding continues until point three is at the arrow on FIG. 5 at which time the rotation of fixture 30 is stopped. In the preferred method of welding the brake web to the brake table, the power is maintained for a predetermined time, approximately 0.05 to 2 seconds, after fixture 30 has stopped rotating. After this time delay, the power is shut off and decays exponentially and, upon reaching a relatively low level after approximately 0.05 to 2 seconds, rotation of the fixture 30 again begins to where point four is at the arrow, the forge wheel is retracted and the web 24 and brake shoe 42 is loaded. After this time, the brake shoe 40 is removed from the fixture 30 while the fixture rotates between points four and five. Point five would be the point at which the table for brake shoe 42 is loaded and the point at which welding between the brake shoe web 24 and the brake table 26 and brake shoe 42 begins. The welding of the brake shoe 42 would continue until point six is at the arrow. The process would then be continually repeated as set forth above to enable the high speed welding of the brake shoes.

The above described method, including time delays, for welding the brake web 24 to the brake table 26 results in an excellent weld as close as approximately $\frac{1}{2}$ inch from the end of the brake table. The prior art has mainly concerned itself of long structural shapes such as "I" beams or tubing whereas the present invention teaches a method for welding relatively short finite parts with a typical embodiment having a weld of 16 inches. The length of the time delay must be accurately predetermined to insure the strength of the weld at the beginning and end of the finite length described above. A short time delay will cause a weak start on the weld. Too long a time delay will cause excessive melting of the web cross section which not only will produce a weak weld but also cause the metal to flow along the sides of the brake web and brake table interface which would cause drop like projections 25 shown in FIG. 2. These drop like projections, if extending along the brake table surface for too great a distance, would cause interference during other operations such as riveting the brake lining to the brake shoe. In the present invention, these drop like projections are minimized and extend no more than $\frac{1}{8}$ inch along the brake table surface. This is well within the limits required to avoid interference during brake shoe lining assembly.

Figure 6:
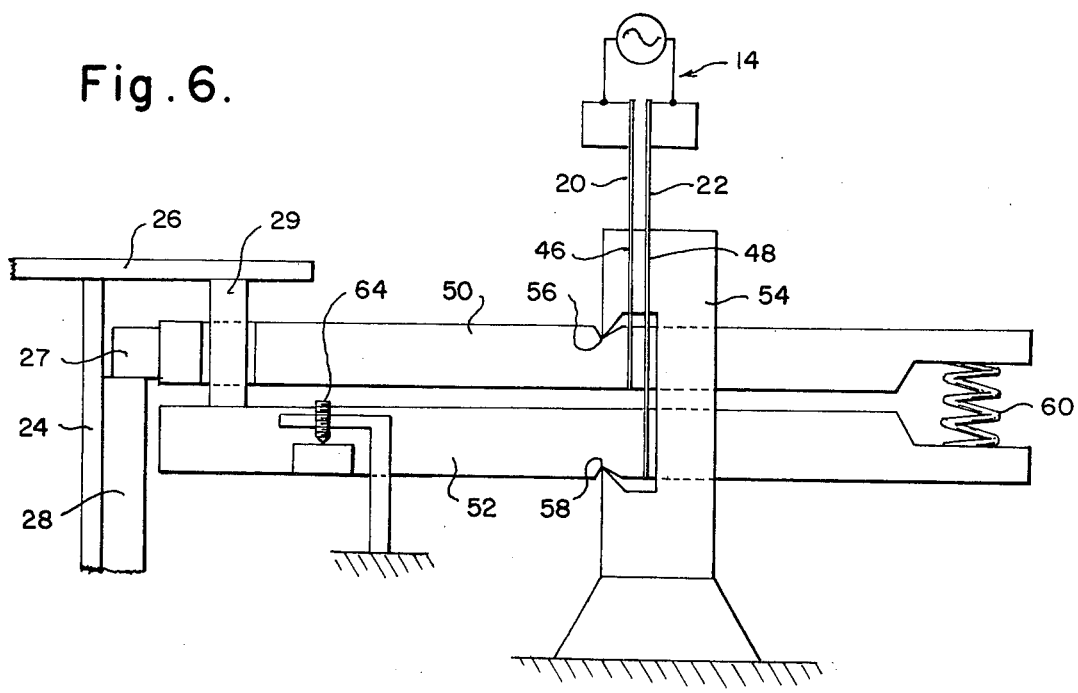
FIG. 6 is an elevational view of the apparatus for transferring electrical power to the brake shoes.

FIG. 6 provides a detailed view of the method for conducting power to the brake web 24 and the brake table 26. Power is conveyed from the high frequency transformer 14 through the secondary conductors 20 and 22. The secondary conductors 20 and 22 are composed of a first flexible portion 46 and 48 respectively and a second rigid portion 50 and 52 respectively. The rigid portions 50 and 52 are pivotally connected by a clamp support 54 which has two pivot points 56 and 58. The rigid conductor 50 pivots about point 56 and the rigid conductor 52 pivots about point 58. A spring 60 is positioned between rigid conductor 50 and 52 at an end thereof away from the welding area. The spring 60 acts to move the table contactor 29 which is attached to rigid conductor 52 into engagement with the table 26. The spring also moves the web ring contactor 27 which is attached to rigid conductor 50 into engagement with the web ring 28. The no load height adjustment screw 64 is provided to adjust the height of the table contactors 29 so that the table can feed over the contactors before the forge wheel is brought down. In addition, the adjustment screw provides a preload force therebetween the web ring and the web ring contactor. The force of table 26 against the table contactor 29 pivots contactor 52 around pivot point 58 pressing spring 60 which, in turn, pivots rigid conductor 50 about pivot point 56 forcing the web ring contactor 27 into engagement with the web ring 28 with greater force than achieved with the preload screw.

In the preferred embodiment, the web ring 28 contacts the brake shoe web over the entire radial length of the web. The web ring 28 rotates with fixture 30 as the web is rotated past the weld point between the web 24 and table 26. At any point after the loading of the webs onto fixture 30, the web ring contactor 28 is forced into positive electrical contact by pneumatic, mechanical or hydraulic means (not shown) located within fixture 30. A high contact force between the web ring 28 and the web 24 is required to insure no arcing between the contacting surfaces. This arcing may occur because of the lubricant film which is present on all of the electrical contact surfaces due to the design of the machine. It has been found that a contact force of 25 to 40 pounds per square inch between the contacts is required to insure no arcing between contacting surfaces. If arcing were to occur, the life of the electrical contacts would be substantially reduced. In addition, contact forces of between 25 and 40 pounds per square help overcome minor surface irregularities between the contacting surfaces which also would contribute to arcing problems.

The initial load between the web ring contactor 27 and the web ring 28 can vary between the slight gap, consequently no force, and $\frac{1}{2}$ pound per square inch. As stated above, a pressure of between 25 and 40 pounds per square inch is required to insure positive electrical contact. Since the welding system described herein requires positive electrical contact to insure induction of electrical power without arcing, the term "contact"

used herein denotes contact between conductors with a pressure of between 25 and 40 pounds per square inch rather than mere touching.

The flexible conductors 46 and 48 are tied into the rigid contactors 50 and 52 respectively in the area of the pivot points 56 and 58 which enables the use of flexible conductors which flex only about 2 degrees at the ends connected to the rigid conductors 50 and 52 while motion at the end of conductors 50 and 52 may be as much as ½ inch. In the preferred embodiment, layers of copper sheet soldered together at their ends are used to form flexible conductors 46 and 48. It should be noted that insulation (not shown) separates flexible conductors 46 and 48 and rigid conductors 50 and 52. This prevents, arcing of power between the conductors and the resultant short circuit effects. In the preferred embodiment, the conductors are separated by sheets of Teflon, a registered trademark of the E. I. Dupont Company, approximately ⅛ inch thick. The Teflon insulation would be present at all points between the conductors. In addition, the clamp support 54 with its pivot points 56 and 58 is made out of a non electrically conductive material. In the preferred embodiment, the support assembly 54 is machined out of Delrin block.

Figure 2:
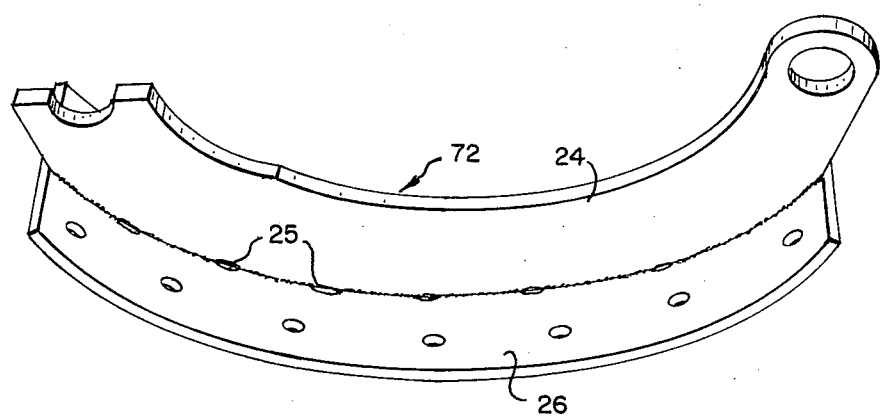
FIG. 2 illustrates a brake web welded by the method and apparatus of the present invention.
Figure 7:
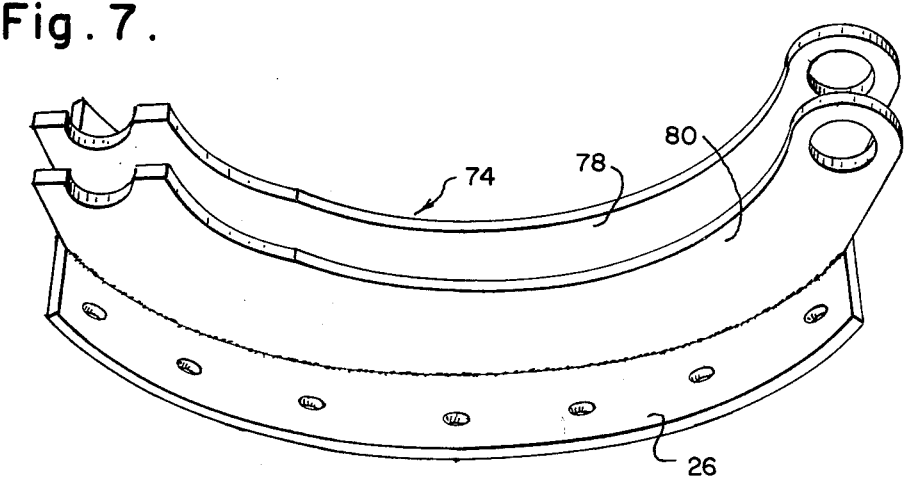
FIG. 7 is a isometric view of the preferred brake shoe of the present invention.

FIGS. 2 and 7 show brake shoes 72 and 74 which are welded by the apparatus and method of the present invention. The only difference between FIGS. 2 and 7 is that FIG. 2 shows a brake shoe having one web 24 and FIG. 7 shows a brake shoe having two webs 78 and 80. In both cases, webs 24 are welded to the brake tables 26 by a continuous weld produced by radio frequency current. The above description deals mainly with the welding of one web to a brake table. If it is desired to weld two webs simultaneously to a brake table, the schematic of FIG. 2 would have to have a mirror image about the center line of the brake table 26. This would mean that a second set of oscillators, transformers, primary conductors, secondary conductors and table and web contactors would be required. One fixture 30 and one forge wheel 38 could be utilized to handle either one or two webs.

If two webs were desired, there would have to be two table contactors 29 each located outboard of its adjacent web. Two web ring contactors 27 and two web rings 28. would be required. The web ring 28 would also be located on the outboard side of each web 24. The web ring 28 could theoretically be located on the inside of the webs 24 except that in practice the room between the two webs is usually insufficient to permit insertion of two contactors.

In the preferred embodiment, the brake shoe webs 24 and the brake shoe tables 26 are fed onto fixture 30 automatically. This automatic feeder could be either air or hydraulically operated in that a pusher arm (not shown) would push each web into engagement with the web fixture 30 while a similar pusher arm would push the brake table 26 against the stop on the fixture 30. Due to the high voltage required and the high current densities involved in the above welding process, it would not be safe to feed the brake webs and brake tables by hand. The use of an automatic feeder and the indexing described above for making the radio frequency weld easily lends itself to electronic controls that enable the whole process to be fully automated. Thus, the apparatus of the present invention is able to produce far more brake shoes in a given time than were possible with several semi-automatic operated machines of the prior art. Specifically, an entire brake shoe can be loaded, welded and removed from the machine in 6 to 8 seconds.

Welds produced by the apparatus and method described above, being continuous, provide a far superior bonding between the brake web 24 and the brake table 26. Destructor tests run on brake shoes manufactured by the method of the present invention have failed by shearing the material of the brake table approximately ½ inch from the weld joint over the whole length of the weld. In contrast, brake shoes manufactured under the prior art resistance welding failed by shearing the weld at each of the projection welds. An additional advantage of a continuous weld is that no reinforcement arc welding of defective projection welds is necessary as was performed under the prior art when a poor weld was detected. This was done because one defective projection would substantially reduce the strength of the joint between the brake table and the brake web. The brake shoe of the present invention, having a continuous weld made with high voltage, high energy would not suffer from a defective weld in one small area. Surface impurities on the web or table decompose and are flushed out in the metal expulsion. The increased strength of the brake shoe produced by the present invention is due to the fact that 70 to 80% of the cross section of the web has fusion and this 70 to 80% continues for the entire weld length. To obtain the same effect in the area of the projection welds of the prior art, an excessive amount of weld heat would have had to been used.

An additional advantage of utilizing the high power density inherent with radio frequency welding is that the 70 to 80% weld across the thickness of the web is achieved without distorting the brake shoe table as much as the prior art. Th table stays flat along its width to within 0.020". Also, the prior art projection welded brake shoes had humps due to the welded projections which could not always be taken out by a "coining" operation.

Figure 8:
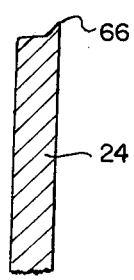
FIG. 8 is a sectional view of the brake web of the present invention prior to welding.

FIG. 8 shows a cross section of the brake web 24 prior to the welding operation of the present invention. As is the case with most brake webs and brake tables, it has been stamped out of a flat plate which has a thickness in the preferred embodiment of about 0.320 inches. As can be seen from the figure, a die brake, or projection 66 remains after the stamping operation. In the prior art the die break would encourage misalignment of the table to the webs by causing the table projections to shift to the side before meeting. Utilizing a high frequency method of welding, the die brake acts to concentrate the current at the vertex between the brake web 24 and brake table 26 and further provide metal to form the weld between the brake web and the brake table. While the above welding method does not require a projection 66 for success, the die brake 66 enhances the weldability of the brake table and the brake web rather than being deleterious as it was in the prior art.

It will be apparent that the invention herein disclosed is well calculated to achieve the benefits and advantages hereinabove set forth, it will be appreciated that the invention is susceptible to modification, variation and change without departing from the spirit hereof.

I claim:

1. A method of welding an edge surface of a curved metal brake shoe web to a metal brake shoe table surface having a greater radius of curvature than said brake shoe web edge comprising:

positioning said brake shoe table in longitudinal alignment with said brake shoe web with one end portion of said table surface abutting said brake shoe web surface over a predetermined distance and with said table surface diverging away from said brake shoe web edge surface and forming a vertex where said surfaces abut, pressing said abutting surface together at said vertex, contacting said diverging surface of said brake shoe table with an electrode spaced from said vertex, contacting said brake shoe web with an electrode, providing a high frequency alternating potential to said electrodes contacting said table and said web to induce current to flow therebetween and thereby heat the interfacing surfaces in the area of said vertex, rotating said brake shoe table and said brake shoe web together along a curvelinear path while maintaining said pressure and said high frequency heating current to melt said interfacing surfaces together, said rotation starting a predetermined time after said current is induced to flow between said table and said web, stopping said rotation before said electrode contacting said table traverses the other side of said diverging table surface; and reducing said alternating potential and thereby allowing said high frequency current to dissipate.

2. The method defined by claim 1, wherein said alternating potential is derived from a high frequency ocillator.

3. The method defined by claim 2, wherein said high frequency alternating potential is in the range of 200,000 Hz to 450,000 Hz.

4. The method defined by claim 1 wherein said predetermined time is between 0 and 2 seconds.

5. A method of welding an edge surface of a curved metal brake shoe web to a metal brake shoe table surface having a greater radius of curvature than said brake shoe web edge comprising:

positioning said brake shoe table in longitudinal alignment with said brake shoe web with one end portion of said table surface abutting said brake shoe web surface over a predetermined distance and with said table surface diverging away from said brake shoe web edge surface and forming a vertex where said surfaces abut, pressing said abutting surfaces together at said vertex, contacting said diverging surface of said brake shoe table with an electrode spaced from said vertex, contacting said brake shoe web with an electrode, providing a high frequency alternating potential to said electrodes contacting said table and said web to induce current to flow therebetween and thereby heat the interfacing surfaces in the area of said vertex, rotating said brake shoe table and said brake shoe web together along a curvelinear path while maintaining said pressure and said high frequency heating current to melt said interfacing surfaces together, stopping said rotation before said electrode contacting said table traverses the other side of said diverging table surface;

maintaining said pressure and said high frequency heating current for a predetermined time after said rotation has stopped; and reducing said alternating potential and thereby allowing said high frequency current to dissipate.

6. The method for welding a metal brake table to an edge of a curved metal brake web as set forth in claim 5, further comprising the step of contacting the brake table with a first conductor and contacting the brake web with a second conductor to introduce said high frequency heating current to said brake web and said brake table.

7. The method for welding a metal brake table to an edge of a curved metal brake web as set forth in claim 5, wherein said predetermined time is between 0 and 2 seconds.

8. The method for welding a metal brake table to an edge of a curved metal brake web as set forth in claim 5, wherein the heating current is at a frequency of between 200,000 Hz and 450,000 Hz.

* * * * *

UNITED STATES PATENT AND TRADEMARK OFFICE
CERTIFICATE OF CORRECTION

PATENT NO. : 4,323,754
DATED : April 6, 1982
INVENTOR(S) : L. A. Boros

It is certified that error appears in the above—identified patent and that said Letters Patent is hereby corrected as shown below:

Column 1, Line 9, delete "the", second occurrence.

Column 4, Line 26, "and" should read --are--.

Column 5, Line 57, "sch" should read --such--.

Column 8, Line 35, "Th" should read --The--.

Signed and Sealed this

Thirtieth Day of November 1982

[SEAL]

Attest:

GERALD J. MOSSINGHOFF

Attesting Officer    Commissioner of Patents and Trademarks